June 20, 1961
G. E. SEUFERT ET AL
2,988,841
CAKES OF SOAP AND THE LIKE HAVING ATTACHMENT MEANS
Filed April 2, 1959
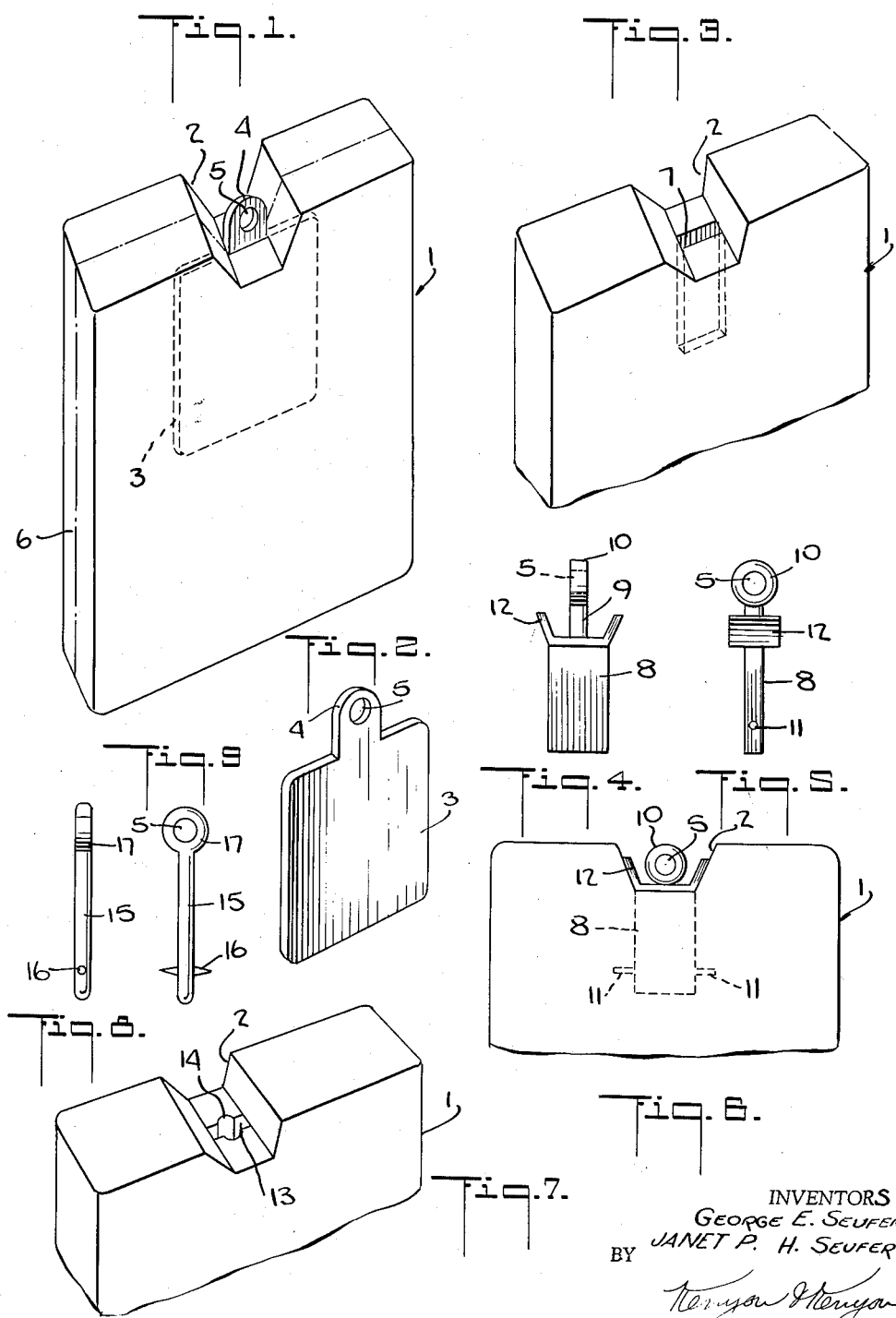
INVENTORS
GEORGE E. SEUFERT
JANET P. H. SEUFERT
BY
ATTORNEYS United States Patent Office 2,988,841
Patented June 20, 1961

2,988,841
CAKES OF SOAP AND THE LIKE HAVING ATTACHMENT MEANS
George E. Seufert and Janet P. H. Seufert, New York, N.Y. (both of 67—45 Clyde St., Forest Hills 75, N.Y.)
Filed Apr. 2, 1959, Ser. No. 803,797
4 Claims. (Cl. 45—28)

This invention is an improvement in articles such as cakes of soap, detergents, other cleansing agents or cosmetics, so shaped and equipped that they can be hung up to dry after each occasion of use, to preserve the entire mass of every cake in the best condition for continued use in the usual way.

An important object of our invention is to provide a recessed cake of soap, etc., with inset member that does not extend beyond the peripheral outline of the cake, and is adapted to allow the cake to be suspended from any convenient fixture or support; instead of being laid down in contact with a washstand or some other surface after it has been moistened. When a wetted cake is laid down on a supporting surface, it will adhere to such a surface as it dries, and when one again takes it in hand, a film is detached from the cake and a part of the cake is thus lost. If the cake is put to use again before it has completely dried, the gelatinous mass on its supported side washes away entirely. Our invention obviates such unnecessary waste, and the cake is kept in a more desirable condition for subsequent handling, and our invention enables the user to have a substantially full sized cake until the cake, etc., is finished.

A cake of our invention can therefore be packaged as easily as an ordinary cake and with the inset member that does not extend out beyond the peripheral dimensions of the cake, the article can be applied to a cloth or to one's skin without any unpleasant rubbing or chafing. Also the inset member is simple, having in one embodiment the form of an ornamental panel, and it can be produced and located in the cake quickly and readily and at little expense.

All the objects and advantages of our invention are set out in the following detailed description, which discloses several embodiments of our improved suspendable cake. The drawings illustrate the combination of the cake for example, and inset member, and the novel characteristics are defined in the appended claims. In practice, of course, changes in various respects may be made in the constructions shown, without departure from the general plan which contains the essential novel features by which the invention is distinguished.

On the drawings:

FIGURE 1 shows in perspective a cake with an inset member embedded therein.

FIGURE 2 is a view of an inset member having the configuration of a small panel.

FIGURE 3 shows how a cake can be made with a recess and cavity in one edge at an end, to receive a variation of an inset member, after the cake is made.

FIGURES 4 and 5 show in face and side views respectively the inset member to be located in said cavity and recess.

FIGURE 6 shows the inset member of FIGURES 4 and 5 completely anchored into the cake.

FIGURE 7 is a perspective view of part of a cake of our invention with a modified recess and cavity in an end thereof; and FIGURES 8 and 9 show respectively in side and front elevation an inset member for the soap in FIGURE 7.

In FIGURE 1, a cake is indicated at 1, and it is shown with a recess 2 in its edge at one end extending through the cake and having an open end in each face of the cake; which recess may be round as well as rectangular, or have any other selected outline. Embedded in the cake 1 is a plate or panel 3, having a tab 4 projecting from one end and in the tab is an aperture 5. The panel 3 is so located that it is entirely enveloped by the mass of the cake, except for the tab 4, which is in the recess 2, but does not project beyond the surface plane of the cake 1, or plane of the outer edges of the recess 2. In this case, the recess has sloping sides. With this design the cake can be used in the same way as an ordinary cake or piece of material and the user's hands can be rubbed over it without touching the tab 4, and the cake can be packaged for sale in the same way as an ordinary cake. The panel 3 may be of plastic material for example, with ornamental designs on both faces, if desired.

FIGURE 3 shows in perspective a piece of soap 1 having the same recess 2, with a transverse cavity 7 in the middle at the bottom of the recess 2. Into this cavity we thrust an inset member 8 having a movable stem 9 projecting at one end, and on the outer end of the stem 9 is a head 10 with an aperture 5. The stem 9 and inset are so made that when the stem is pushed into the body of the member 8 and turned, it forces out at the sides of this member a pair of barbs 11 which penetrate the cake at both sides of the cavity 7 and prevent the removal of said member. At the outer end of the member 8 are sloping ribs 12 which engage the inclined sides of the recess when the member 8 is put into place, in order to seal the openings between the cake and inset member, and prevent erosion at such places.

To anchor the member in the cake, the member is pushed into the cavity 7 which it fits snugly, the head 10 then being at a right angle to the broad faces of the member 8, see FIGURE 4, and then stem 9 is forced inward. The head is then turned as in FIGURE 6, to dispose the head across the recess 2, and this movement impels the barbs 11 outward. The inner construction of the member 8 and the manner of connecting the stem 9 to the barbs 11 are set forth in our copending application for patent on this type of inset member and some others, Serial No. 803,798 filed of even date herewith.

In FIGURES 7, 8 and 9, a cake 1 is illustrated of the same type as in FIGURE 3, with a recess 2 having a transverse cavity 13 in the middle of the base of the recess. Into this cavity, we insert a stem 15 having barbs 16 projecting out in opposite directions at one end; and a loop 17 at other end at a right angle to the barbs 16. When this stem is inserted into the cavity 13, and the lower end of the stem 15 reaches the bottom of the cavity, the head 5 is turned to lie across the recess 2, as in FIGURE 6. The barbs 16 then enter the cake and anchor the member in the cake 1; and the loop enables the cake to be suspended from any convenient fixture.

The cakes shown in FIGURES 3, 6 and 7 have all the utility and advantages of the cake displayed on FIGURE 1.

An important additional advantage is that the inset members, to be used in conjunction with these cakes, as illustrated in FIGURES 4, 5, 8 and 9, can be inserted and anchored into the cakes either during manufacture or after manufacture, by the user. And they can be extracted when desired and re-used, indefinitely in other cakes.

The invention as above described can of course be utilized in connection with bars or cakes formed of other soluble substances.

Having described my invention, what we believe to be new is:

1. A cake of soluble substance having a recess at one end extending through both faces of the cake, and an inset member embedded in said cake, said member having a perforated head in said recess terminating within the plane of the ends of outer edges of said recess, said recess having a transverse cavity at its base, the inset being anchored in said cavity, and comprising a shank with barbs at the sides, and a perforated head which extends crosswise in said recess.

2. A cake of soluble material having a recess at one end extending through both faces of the cake, and an inset member embedded in said cake, said member having a perforated head in said recess terminating within the plane of the shoulders of the said recess, said recess having a transverse cavity in its base, the member being anchored in said cavity, and comprising a stem with barbs at the sides adjacent one end, and a perforated head at the other end extending crosswise relative to said barbs, said cavity extending across the recess, said member being insertible in the cavity, the apertured head being adapted for suspending the cake to be disposed across said recess to cause the barbs to penetrate the soap.

3. A cake of soluble substance having a recess at one end extending through both faces of the cake, and an inset member embedded in said cake, said member having a perforated tab in said recess terminating within the plane formed by the shoulders of the recess, and said member having a shoulder shaped to fit said recess and lie flush against said recess surfaces when said member is fully embedded in said cake.

4. A cake of soluble material having a recess at one end extending through both faces of the cake, and an inset member embedded in said cake, said member having a perforated tab in said recess terminating within the plane of the shoulders of the said recess and coplanar barbs embedded in said cake from said member, said recess having a slotted cavity into the body of said cake from said recess, the plane of said slotted cavity being rotated from the plane of said barbs when embedded in said cake.

References Cited in the file of this patent
UNITED STATES PATENTS

| | | |
|---|---|---|
| 487,094 | Oefinger | Nov. 29, 1892 |
| 843,330 | Drought | Feb. 5, 1907 |

FOREIGN PATENTS

| | | |
|---|---|---|
| 585,567 | France | Mar. 3, 1925 |